United States Patent
Watanabe et al.

(10) Patent No.: US 7,979,055 B2
(45) Date of Patent: Jul. 12, 2011

(54) APPARATUS AND METHOD FOR PROVIDING CONTENTS

(75) Inventors: Yuko Watanabe, Nara (JP); Madoka Tsutsumi, Tokyo (JP); Hidetoshi Yazaki, Yokosuka (JP); Takeshi Higuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 2452 days.

(21) Appl. No.: 10/239,952

(22) PCT Filed: Dec. 5, 2001

(86) PCT No.: PCT/JP01/10629
§ 371 (c)(1), (2), (4) Date: Sep. 23, 2002

(87) PCT Pub. No.: WO02/46934
PCT Pub. Date: Jun. 13, 2002

(65) Prior Publication Data
US 2003/0140104 A1   Jul. 24, 2003

(30) Foreign Application Priority Data

Dec. 6, 2000   (JP) ................................. 2000-371807

(51) Int. Cl.
*H04M 3/42* (2006.01)
*H04M 1/00* (2006.01)
*G06F 15/16* (2006.01)

(52) U.S. Cl. ............ 455/412.1; 455/556.1; 709/206; 709/218; 711/154; 711/162; 717/173; 725/140

(58) Field of Classification Search .......... 709/206, 709/218; 707/10; 711/154, 162; 717/173; 725/139, 140
See application file for complete search history.

(56) References Cited

U.S. PATENT DOCUMENTS

| 5,283,856 A |   | 2/1994 | Gross et al. |
| 5,485,503 A | * | 1/1996 | Diem ..................... 340/7.29 |
| 5,546,535 A | * | 8/1996 | Stallmo et al. .............. 714/9 |
| 5,721,829 A | * | 2/1998 | Dunn et al. ................ 725/87 |
| 5,781,901 A | * | 7/1998 | Kuzma ..................... 707/10 |
| 5,923,845 A |   | 7/1999 | Kamiya et al. |
| 5,956,486 A | * | 9/1999 | Hickman et al. .......... 709/206 |

(Continued)

FOREIGN PATENT DOCUMENTS

CN   396308   7/2000

(Continued)

OTHER PUBLICATIONS

Canadian Office Action dated Apr. 5, 2006.

(Continued)

*Primary Examiner* — Brian T Pendleton
*Assistant Examiner* — Jonathan V. Lewis
(74) *Attorney, Agent, or Firm* — Brinks Hofer Gilson & Lione

(57) ABSTRACT

When a server receives an information designating image from a communication terminal connected to a server through a network, it sends a URL identifying the storage location of the image to the communication terminal. When the communication terminal receives the URL, it loads the URL into an email and transmits the email to another communication terminal. When the communication terminal that received this email finds out that the URL integrated in the email identifies the storage location of the image, it downloads the image from the server and displays it along with the email by using the URL.

14 Claims, 5 Drawing Sheets

U.S. PATENT DOCUMENTS

| | | | |
|---|---|---|---|
| 6,021,276 A * | 2/2000 | Demke et al. | 717/178 |
| 6,023,345 A * | 2/2000 | Bloomfield | 358/402 |
| 6,049,342 A * | 4/2000 | Nielsen et al. | 345/473 |
| 6,065,048 A * | 5/2000 | Higley | 709/218 |
| 6,081,780 A * | 6/2000 | Lumelsky | 704/260 |
| 6,108,709 A * | 8/2000 | Shinomura et al. | 709/239 |
| 6,138,149 A | 10/2000 | Ohmura | 709/218 |
| 6,185,605 B1 * | 2/2001 | Kowaguchi | 709/206 |
| 6,208,995 B1 * | 3/2001 | Himmel et al. | 1/1 |
| 6,246,672 B1 * | 6/2001 | Lumelsky | 370/310 |
| 6,275,850 B1 * | 8/2001 | Beyda et al. | 709/206 |
| 6,289,371 B1 * | 9/2001 | Kumpf et al. | 709/203 |
| 6,301,513 B1 * | 10/2001 | Divon et al. | 700/94 |
| 6,301,574 B1 * | 10/2001 | Thomas et al. | 1/1 |
| 6,324,544 B1 * | 11/2001 | Alam et al. | 707/201 |
| 6,442,600 B1 * | 8/2002 | Anderson | 709/217 |
| 6,449,634 B1 * | 9/2002 | Capiel | 709/206 |
| 6,463,463 B1 * | 10/2002 | Godfrey et al. | 709/206 |
| 6,493,760 B1 * | 12/2002 | Pendlebury et al. | 709/229 |
| 6,578,054 B1 * | 6/2003 | Hopmann et al. | 707/625 |
| 6,671,509 B1 * | 12/2003 | Tanaka et al. | 455/419 |
| 6,732,358 B1 * | 5/2004 | Siefert | 717/173 |
| 6,745,024 B1 * | 6/2004 | DeJaco et al. | 709/206 |
| 6,766,458 B1 * | 7/2004 | Harris et al. | 726/6 |
| 6,769,019 B2 * | 7/2004 | Ferguson | 709/219 |
| 6,871,009 B1 * | 3/2005 | Suzuki | 386/95 |
| 6,886,030 B1 * | 4/2005 | Easterbrook et al. | 709/206 |
| 6,898,622 B1 * | 5/2005 | Malik | 709/206 |
| 7,039,678 B1 * | 5/2006 | Halahmi et al. | 709/206 |
| 7,124,175 B1 * | 10/2006 | Wolfe et al. | 709/219 |
| 7,149,777 B1 * | 12/2006 | Rhee | 709/206 |
| 7,209,949 B2 * | 4/2007 | Mousseau et al. | 709/206 |
| 7,209,950 B2 * | 4/2007 | Bennett et al. | 709/206 |
| 7,412,223 B1 * | 8/2008 | Yamamoto et al. | 455/403 |
| 2001/0025260 A1 * | 9/2001 | Blumofe | 705/27 |
| 2001/0033736 A1 * | 10/2001 | Yap et al. | 386/46 |
| 2002/0002582 A1 * | 1/2002 | Ewing et al. | 709/202 |
| 2002/0026513 A1 * | 2/2002 | Hoglund et al. | 709/227 |
| 2002/0042838 A1 * | 4/2002 | Tabayoyon et al. | 709/237 |
| 2002/0049817 A1 * | 4/2002 | Drory et al. | 709/206 |
| 2002/0178232 A1 * | 11/2002 | Ferguson | 709/217 |
| 2003/0005062 A1 * | 1/2003 | Hachiya et al. | 709/206 |
| 2003/0061566 A1 * | 3/2003 | Rubstein et al. | 715/500.1 |
| 2003/0120496 A1 * | 6/2003 | Alfred et al. | 705/1 |
| 2003/0195974 A1 * | 10/2003 | Ronning et al. | 709/230 |
| 2004/0158607 A1 * | 8/2004 | Coppinger et al. | 709/206 |
| 2006/0242315 A1 * | 10/2006 | Nichols | 709/231 |
| 2008/0120113 A1 * | 5/2008 | Loyall et al. | 704/270 |

FOREIGN PATENT DOCUMENTS

| | | |
|---|---|---|
| EP | 0 785 661 A2 | 7/1997 |
| EP | 0 818 742 A1 | 1/1998 |
| EP | 0 869 691 A2 | 10/1998 |
| EP | 0974917 | 1/2000 |
| JP | 11-224228 | 8/1999 |
| JP | 2000-13431 | 1/2000 |
| JP | A-2000-66974 | 3/2000 |
| JP | A-2000-148617 | 5/2000 |
| JP | A-2000-148640 | 5/2000 |
| TW | 396308 | 7/2000 |
| WO | WO 00/64110 | 10/2000 |

OTHER PUBLICATIONS

Japanese Office Action mailed Jun. 20, 2006.

Japanese Office Action mailed Mar. 13, 2007.

European Search Report for Application No. 01999883.0, Mar. 14, 2008.

European Search Report for Application No. 01999883.0, Apr. 7, 2008.

Woo, Thomas Y.C. et al., Providing Internet Services to Mobile Phones: A Case Study with E-mail, Networking Software Research Department, Bell Laboratories, IEEE, 1998.

Sevanto, Jarkko, Multimedia Messaging Service for GPRS and UMTS, Nokia Telecommunications, Nokia Group, Finland, IEEE, 1999.

3GGP, $3^{rd}$ Generation Partnership Project; Technical Specification Group Terminals; Multimedia Messaging Service (MMS); Functional Description; Stage 2, 1999.

Japanese Office Action in Japanese Patent Application No. 2002-548594 dated Nov. 17, 2009 (6 pages) with English translation.

Canadian Office Action issued in Canadian Patent Application No. 2,398,474, dated Aug. 31, 2009 (3 pgs.).

Japanese Office Action in Japanese Patent Application No. 2002-548594 dated May 25, 2010 (27 pages) with English translation.

"Thorough Use of Electronic Mail, Use the Internet," Yomiuri PC, vol. 5, No. 6, Yomiuri Shimbun, Apr. 1, 2000, pp. 32-37, with concise explanation of relevance.

"Techniques for Utilizing Applications, Convenient Browsing! Netscape Communicator 4.7 of Netscape Communications Inc. Enabling Creation of Mail and Page," Mac Fan Internet, vol. 5, No. 1, Mainichi Communications Inc., Dec. 1, 1999, pp. 94-97, with concise explanation of relevance.

"Tips 200 for Thorough Use of Personal Computer, Tips 10 for Internet," Touch PC, vol. 5, No. 3, Mainichi Communications Inc., Mar. 24, 2000, pp. 26-27, with concise explanation of relevance.

Norwegian Office Action issued in Norwegian Patent Application No. 20023693, dated Nov. 5, 2010 (6 pgs., with English translation).

Canadian Office Action, dated Feb. 15, 2011, pp. 1-3, Canadian Patent Application No. 2,398,474, Canadian Intellectual Property Office, Ottawa, Canada.

\* cited by examiner

APPARATUS AND METHOD FOR PROVIDING CONTENTS

TECHNICAL FIELD

The present invention relates to an apparatus and method for providing contents such as images and music.

BACKGROUND ART

Email is generally used as a means of communicating between individuals via a public network. Recently, exchanging an email attached with image data or music data is also gaining popularity.

When sending an email from a mobile phone, certain charges are imposed according to the quantity of data transmitted. Therefore, when sending an email attached with image data or music data, the communication costs are high because the data itself is large in quantity.

Furthermore, when receiving an email attached with image data or music data by mobile phone, since the data itself is large in quantity, storing all the image data or music data is difficult.

DISCLOSURE OF INVENTION

The present invention has been made in the light of the above problem, and has its object the provision a communication terminal and a communication control method intending to save transmission costs of email attached with image data, and, to save memory resource.

The present invention provides a contents delivering method which has a primary communication terminal for loading storage location information indicating a location of contents in a network on an email in response to a reception of a Web page including the storage location information from the network, and transmitting the email to a secondary communication terminal; and the secondary communication terminal for receiving the email and storing it in a storage unit, and obtaining the contents from the network by using the storage location information included in the email in response to an instruction indicating to open the email.

According to the method, it is possible to provide contents to a secondary communication terminal at lower costs, than the case when a primary communication terminal receives contents via a network and transmits them to a secondary communication terminal.

Also, the present invention provides a communication terminal beneficial to the execution of such a contents delivering method.

The present invention provides a communication terminal comprising a communication unit for performing data communication; a storage unit for storing email received by the communication unit; and a controller for performing a process of obtaining contents from a network by using storage location information, when an instruction to open an email stored in the storage unit is made and the email includes storage location information identifying storage location of the content located in the network, through the communication unit.

Preferably, the controller obtains the contents when the storage location information includes specific identification information.

The communication terminal may comprise plural replaying units for converting information included in contents into a recognizable signal, wherein the controller, when opening the email, identifies the type of the content of the email, on the basis of the identification information included in the storage location identification information and replays information included in the contents by a replaying unit appropriate to the type of the content.

The communication terminal may comprise a displaying unit as one of the replaying units, and the controller, when identification information showing that the content stores image data is included in the storage location information, displays the image data by the display along with the content of the email.

The communication terminal may comprise an audio replaying unit as one of the replaying units, and the controller, when identification information showing that the contents is music data or sound data is included in the storage location information, displays the content of the email on the displaying unit and replays the music data or sound data as music by said audio replaying unit at the time of opening the email.

The communication terminal may comprise an operation unit, wherein the controller, on the basis of an operation to the operation unit, determines whether a content is to be obtained when the open instruction is given or when an instruction to obtain is given, and obtain a content in accordance with the determination.

The communication terminal may comprise a non-volatile memory and a replaying unit for replaying the content, wherein the controller provides the contents to the replaying unit when it obtains the contents from a network by using the storage location information, and stores the content provided to the replaying unit in the non-volatile memory when an instruction to store the content is given.

Preferably, the controller reads out the contents from the non-volatile memory and provides the contents to the replaying unit when a instruction to open the email has been given more than two times under a condition in which the content obtained by using storage location information in the email is stored in the non-volatile memory.

The communication terminal can be a mobile phone, and the network includes a mobile communication network.

The present invention provides a contents obtaining method comprising the steps of: receiving an email by a communication unit; storing the email received by the communication unit in a storage unit; obtaining a content from a network, when an instruction to open an email stored in the storage unit is given and the email includes a storage location information identifying a storage location of the contents existing in a network, by the communication unit using the storage location information.

The present invention is applicable to delivering a program product for executing such contents obtaining method to a general user via a network; and also to delivering to a general user by storing in a storage medium.

BEST MODE FOR CARRYING OUT THE INVENTION

The embodiment of the present invention will now be described with reference to the drawings. The embodiment shows one example of the present invention, and the scope of the present invention is not limited thereto. Furthermore, the present invention can be in any way be modified within its technical idea.

Figure 1:
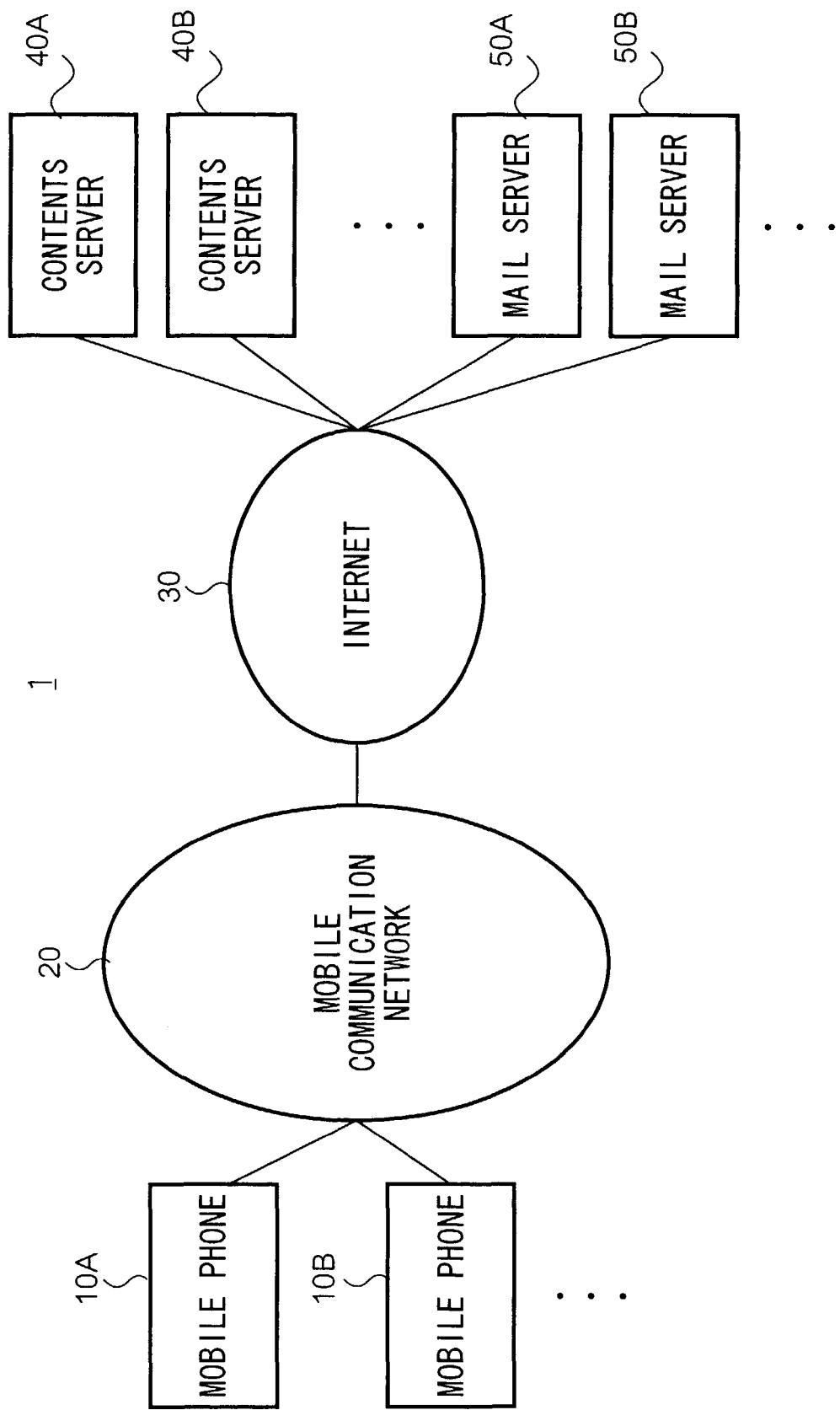
FIG. 1 is a diagram showing a schematic configuration of a mobile communication system according to an embodiment of the present invention.

As shown in FIG. 1, a mobile communications system 1, which is one embodiment of the present invention, includes mobile phones 10A, 10B, a mobile communication network 20, the Internet 30, contents servers 40A, 40B, and mail servers 50A, 50B.

Mobile phones 10A, 10B, are communication terminals, which can enjoy a telephone communication service and a packet communication service via mobile communication network 20, and perform wireless communications with base stations within the mobile communication network. The mobile phones 10A, 10B, contain a World Wide Web (WWW) browser, and email software. In the present embodiment, an improvement on the basis of the present invention is added to the World Wide Web browser and the email software. Mobile phones 10A, 10B, which are the same as a general mobile phone, download data such as image data from content servers 40A, 40B in accordance with the World Wide Web browser, and can transmit the data to other communication terminals by executing an email software. In addition to the normal operation, mobile phones 10A, 10B according to the present embodiment can execute an email software to attach storage location information indicating storage location of data, instead of image data, to an email and transmit it to other communication terminals. Hereinafter, such an email will be referred to as image introducing email. To put it concretely, the storage location information means a Uniform Resource Locator (URL). Furthermore, when mobile phones 10A, 10B according to the present embodiment, receive an image-introducing email in accordance with the email software, and a user opens the email, the mobile phones can download image data from a site indicated by the storage location information contained in the email, and can display the image data along with the content of the email.

Mobile communication network 20 is comprised of base stations, a mobile packet communication network, and a mobile phone network. A mobile packet communication network is a network for providing a packet communication service, and is connected to Internet 30 through a gateway server. A mobile phone network is a network for providing a general service to general mobile phones. Base stations are scattered inside a communication service area of mobile communication network 20. Besides, each base station is able to perform wireless communicate with mobile phones 10A, 10B, which are inside a radio cell formed by the base station.

Contents servers 40A, 40B store information for general users in a Hyper Text Markup Language (HTML) file for example. Furthermore, contents server 40A, and 40B stores image data or application programs such as Java applet and Java application designated by the tag stored in the HTML file. When contents servers 40A and 40B receive a request with respect to the HTML file, image data, and application programs from one of mobile phones 10A or 10B, provides the requested information to the mobile phone through Internet 30 and mobile communication network 20.

In FIG. 1, plural mobile phones 10A, 10B, and contents servers 40A, 40B, and mail servers 50A, 50B are exemplified as mobile phones, contents servers, and mail servers. In the following explanation, however, if there is no need to specify a mobile phone, a contents server, and a mail server, the notation will simply be mobile phone 10, contents server 40, and mail server 50.

The hardware-configuration of mobile phone 10 will be explained with reference to FIG. 2.

Figure 2:
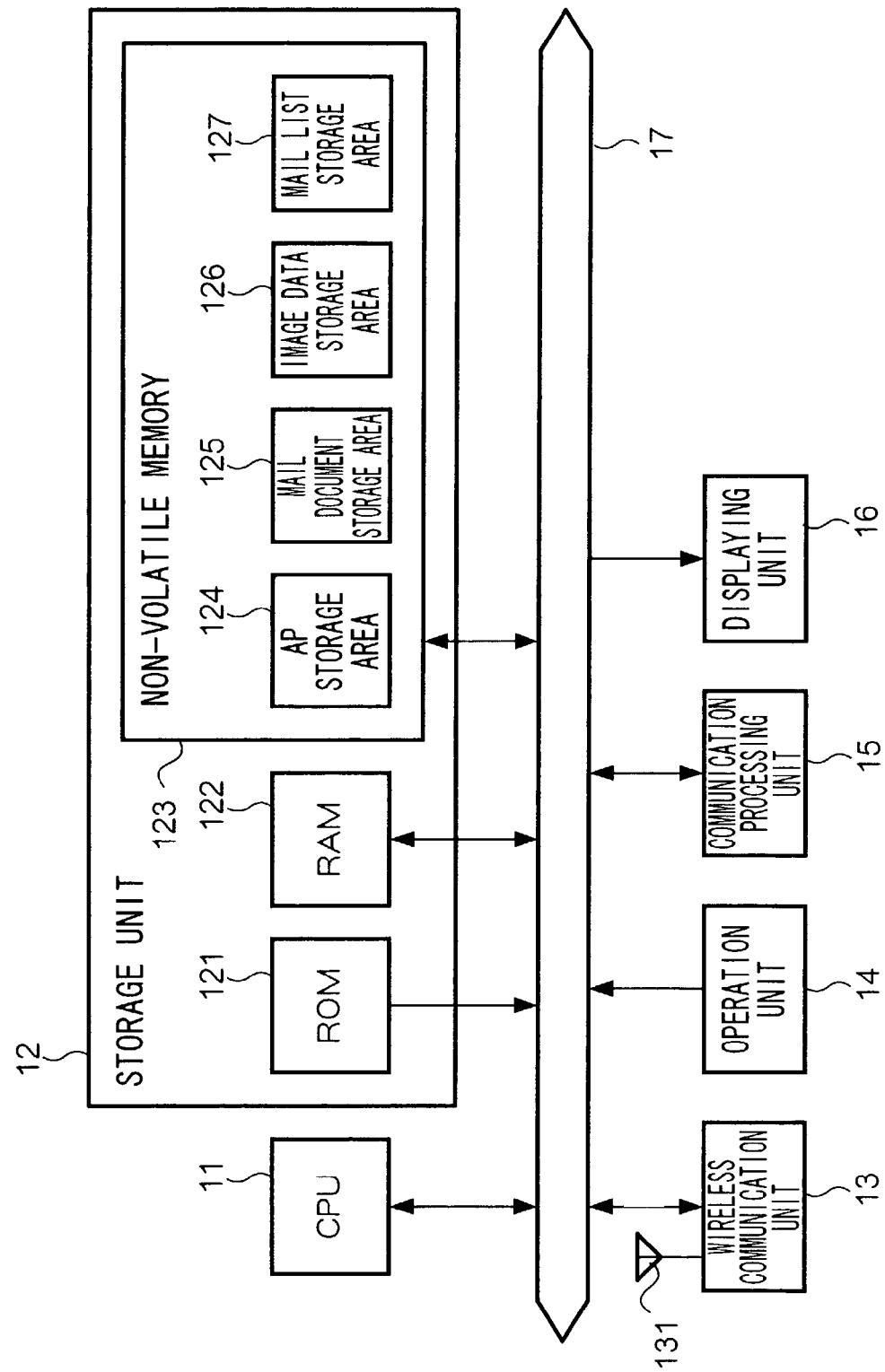
FIG. 2 is a diagram showing a hardware-configuration of a mobile phone in the embodiment.

As shown in FIG. 2, mobile phone 10 comprises a Central Processing Unit (CPU) 11, a storage unit 12, a wireless communication unit 13, an operation unit 14, a communication-processing unit 15, and a displaying unit 16. Furthermore, each part of these units is connected to each other through a BUS 17.

CPU 11 controls each unit connected through BUS 17 by executing various programs stored in memory 12.

Storage unit 12 comprises a Read Only Memory (ROM) 121, a Random Access Memory (RAM) 122, and a non-volatile memory 123.

In ROM 121, various programs to be executed by CPU 11 and control data are stored. The programs include, for example, an operating system for mobile phone 10 and a WWW browser mentioned above.

RAM 122 is used as a work area of CPU 11. For example, in RAM 122, email data and image data received by an email software are stored temporarily.

Non-volatile memory 123 has an application storage area (hereafter, referred to as AP storage area 124), a mail document storage area 125, an image data storage area 126, and a mail list storage area 127. In AP storage area 124, for example, the email software as described above is stored. Image data storage area 126 is an area for storing image data attached to a received email. Mail list storage area 127 is an area for storing information relating to a received image-introducing email (storage location information). The information relating to image-introducing email is such as a URL of image data, or a file name of the image data included in the image introducing-email. Non-volatile memory is such as an Erasable and Programmable Read Only Memory (EPROM), Flash Electrically Erasable and Programmable Read Only Memory (FLASH EEPROM).

Wireless communication unit 13 comprises an antenna 131, and performs wireless communication with base stations. Wireless communication unit 13, under the control of CPU 11, transmits wireless signal including various data such as download request data or email data to base stations via antenna 131. Wireless communication unit13 receives wireless signals transmitted from base stations via antenna 131. Furthermore, wireless communication device 13 obtains various data such as image data, or email data by demodulating the received signal.

Operation unit 14 comprises plural keys for inputting data, such as words, numbers, and commands. Operation unit 14 outputs a manipulate signal to CPU 11 in response to a key operation.

Communication processing unit 15, under the control of CPU 11, performs a communication process, such as a connecting/disconnecting process of a call.

Displaying unit 16 is provided with a liquid crystal panel as a screen display, and a driving circuit for driving the liquid crystal panel.

Next, operations of the mobile communication system according to the present embodiment will be described with reference to a few examples.

(1) <Operation 1>

Figure 3:
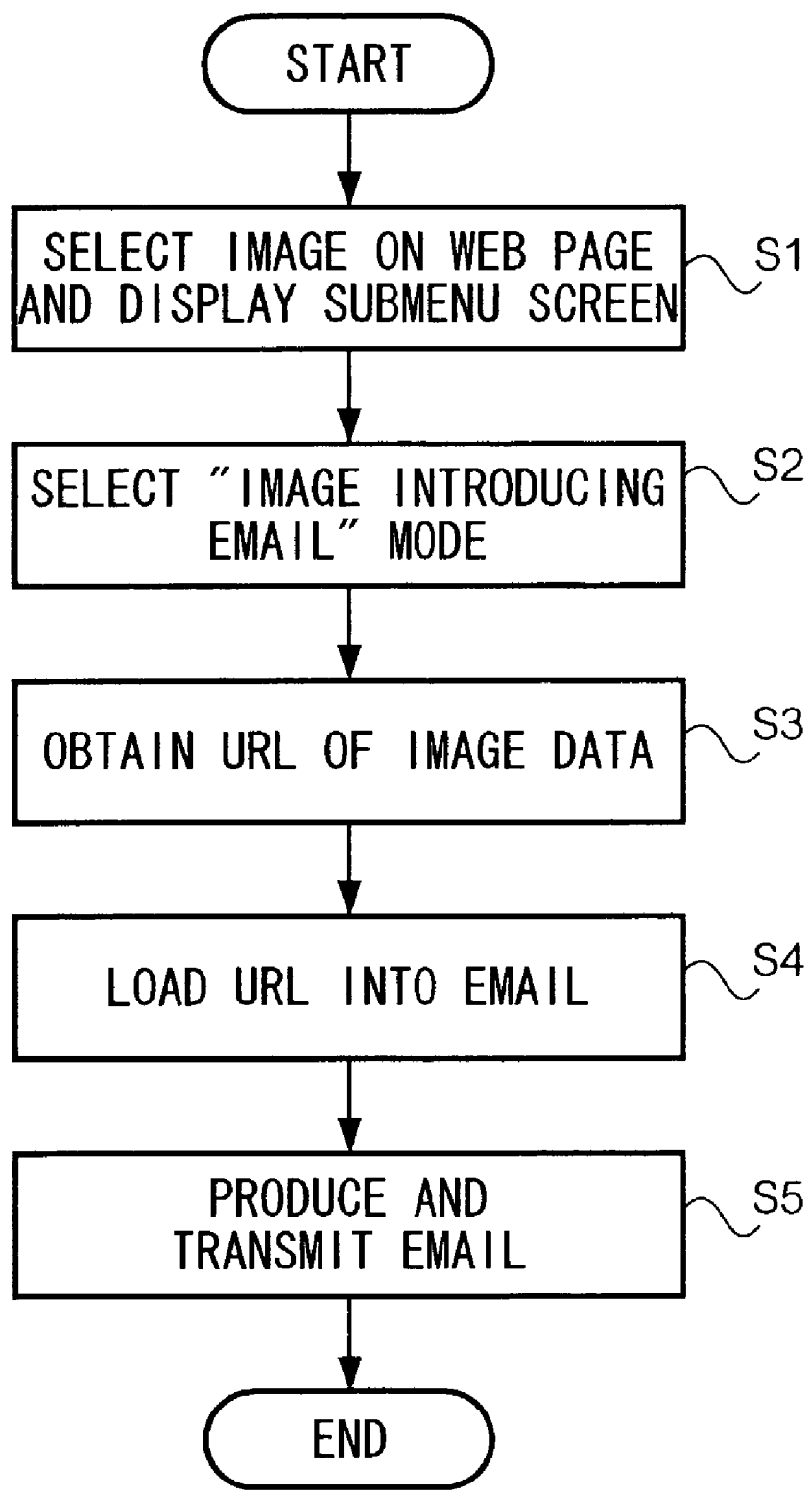
FIG. 3 is a flow chart showing an example of an operation in the present embodiment in which an image-introducing email is generated and transmitted.

In the flow chart of FIG. 3, an example of an operation executable by mobile phone 10A and 10B in FIG. 1 is shown. Thereinafter, for the sake of an explanation, an example will be given, in which the operation shown in FIG. 3 is performed by mobile phone 10A.

At the initial stage, a menu-screen is displayed on a display screen of mobile phone 10A. When a user (hereinafter, referred to as user A) of mobile phone 10A selects "browsing a Web page" mode from the menu-screen by operating operation unit 14, CPU 11 reads out a WWW browser from ROM 121 and executes the browser. In the execution process of the WWW browser, CPU 11, in response to the indication from the user, downloads an HTML file of the Web page from contents server 40A to RAM 122 and displays the Web page on displaying unit 16 for example. The HTML file stores a title list of various image data that can be obtained through Internet 30, and CPU 11 displays the title list by displaying unit 16. Furthermore, in each title of image data in the list, an URL indicating the storage location of the image data is embedded.

When a title list showing the titles of obtainable image data is displayed on displaying unit 16 of mobile phone 10A, a user can select the title of the desired image data by operating operation unit 14. In addition, a user, after selecting the title of the desired image data, can select a sub menu screen by operating operation unit 14. When the submenu screen is selected, CPU 11 obtains the submenu screen from HTML file in RAM 122 and displays the submenu on displaying unit 16 (step S1).

The user can select "image-introducing mail" mode among submenu displayed on the submenu screen by operating operation unit 14 (step S2). When "image-introducing mail" mode is selected, CPU 11 of mobile phone 50 obtains a Uniform Resource Locator (URL) embedded in the title of selected image data from HTML file in RAM 122 (step S3). CPU 11, after storing the obtained URL in a predetermined area in RAM 122, starts to execute the email software stored in AP storage area 124. CPU 11, in the execution process of the email software, reads out the URL from RAM 122 and loads the URL into a new generating email (step S4). The loading of the URL is performed by CPU 11 without any specific operation performed by the user. Such improvements are made available by the email software.

When the email containing the URL is generated and a transmission button is selected and operated by the user, CPU 11 transmits the email containing URL to mail server 50 through wireless communication unit 13 (step S5).

This email is sent to a destination designated by mobile phone 10A through mail server 50 to mobile phone 10B as shown in FIG. 1 for example.

(2) <Operation 2>

Figure 4:
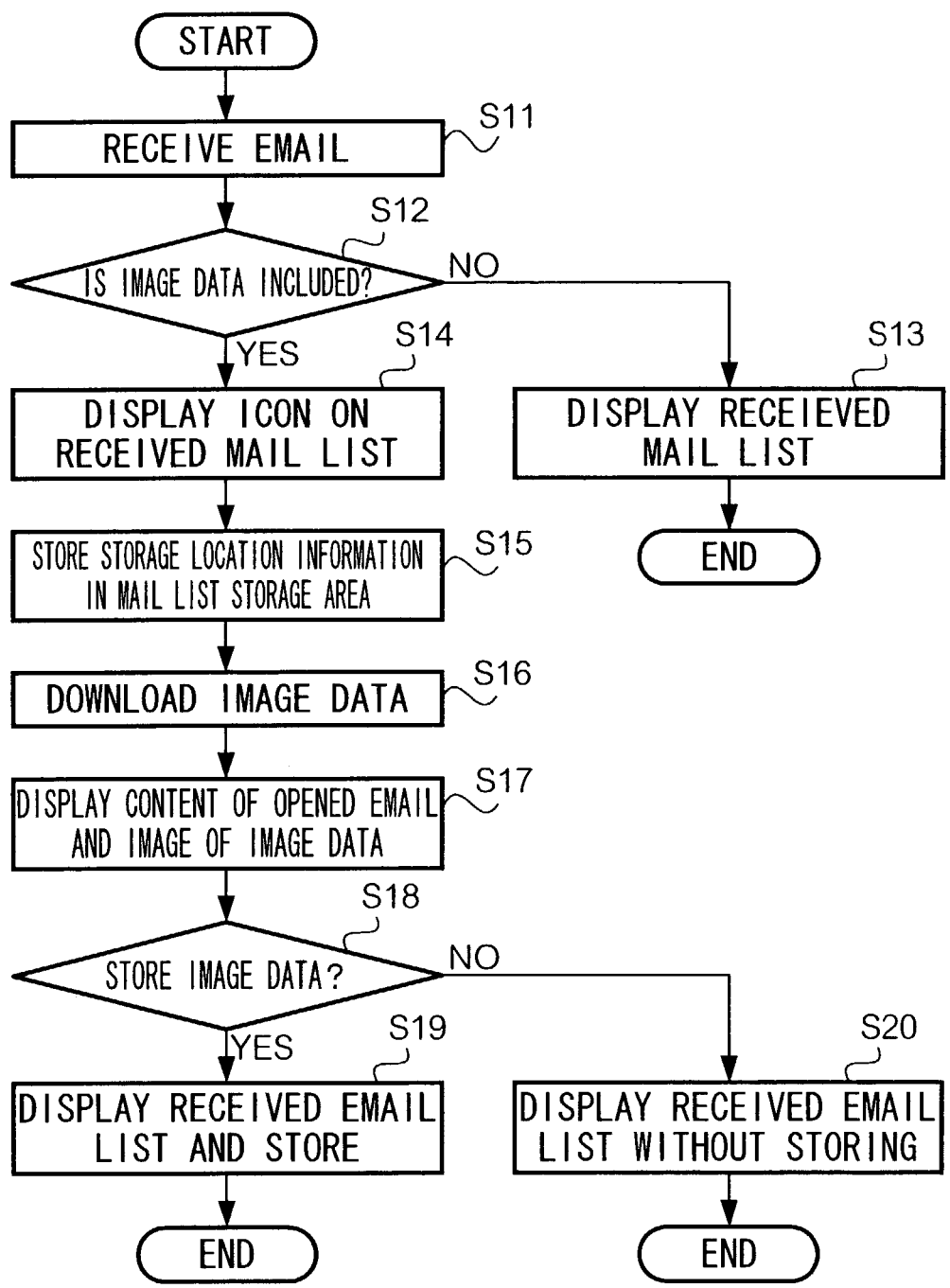
FIG. 4 is a flow chart showing an example of an operation in the present embodiment in which an image introducing email is received and opened.

Flow chart in FIG. 4 shows another operation, which mobile phone 10A and 10B in FIG. 1 can execute. Hereafter, for the sake of explanation, an example will be given, wherein mobile phone 10B, which is the destination of the email transmitted by mobile phone 10A in operation sample 1, performs the operation shown in FIG. 4.

When a menu screen is displayed on displaying unit 16 of mobile phone 10B, a user of mobile phone 10B (hereafter, user B) can designate an "email receiving" mode on a menu screen. When the "email receiving" mode is designated, CPU 11 reads out an email software from AP storage area 124 and executes the email software. Then, CPU 11, in accordance with the email software, receives unread emails addressed to user B from a mail server, for example, mail server 50A, that is in charge of receiving emails addressed to user B (step S11).

CPU 11 determines whether a URL of image data is included in the received email (step S12). This determination can be made as in the following explanation. First, a URL of image data contains a specific identifier showing that the URL is a URL of an image data in a specific type, for example, "gif". Therefore, in step 12, whether it is a URL of image data or not, can be determined according to whether the URL in the email contains such an identifier or not.

When the result of the determination in S12 is "NO", CPU 11 displays the name of the sender, or the title of the received email on the received mail list of display screen (step S13).

On the other hand, when the result of the determination in step S12 is a "Yes", CPU11 displays an icon (identifier) indicating that the received email is an image-introducing email, and includes the name of the sender, or the title of the received email on the received mail list of display screen (step S14).

CPU 11 stores the URL included in the received image-introducing email, and the file name of the image data stored in the URL, in mail list storage area 127 (step S15).

When an image-introducing email is designated among emails displayed on the received mail list, along with an instruction to open the designated email, CPU 11 reads out the URL or the file name, included in the image-introducing email, from mail list storage area 127, and stores them in a predetermined storage area inside RAM 122, and starts to execute a WWW browser. When the WWW browser is executed, CPU 11 reads out the URL and the file name from RAM 122 in the execution process of WWW browser. By using the URL and file name, CPU 11 downloads the image data, for example, from contents server 40A to RAM 122 (step S16), and returns to the execution of the email software.

CPU 11, in the execution process of the email software, attaches the image of the downloaded image data stored in RAM 122 to the email that was instructed to be opened and displays the image of the image data with the content of the opened email on a display screen (step S 17).

Next, when user B intends to close the image data-introducing email, CPU 11 displays a message requiring the user for an instruction whether to store the image data (step S18).

When the determination of the user in step S18 is "Yes", CPU 11 stores the image data stored temporarily in RAM 122 in image data storage area 126, and displays a received mail list (step S19).

On the other hand, in step 18, when the instruction input by the user is an instruct to discard an image data (step S18; No), CPU 11 closes the image-introducing email without storing the image data, and displays a received mail list (step S20).

As explained above, even if a received email is an image-introducing email, because an image data can be stored, or discarded on the basis of a user's instruction, it is possible to save memory resource.

(3) <Operation 3>

Figure 5:
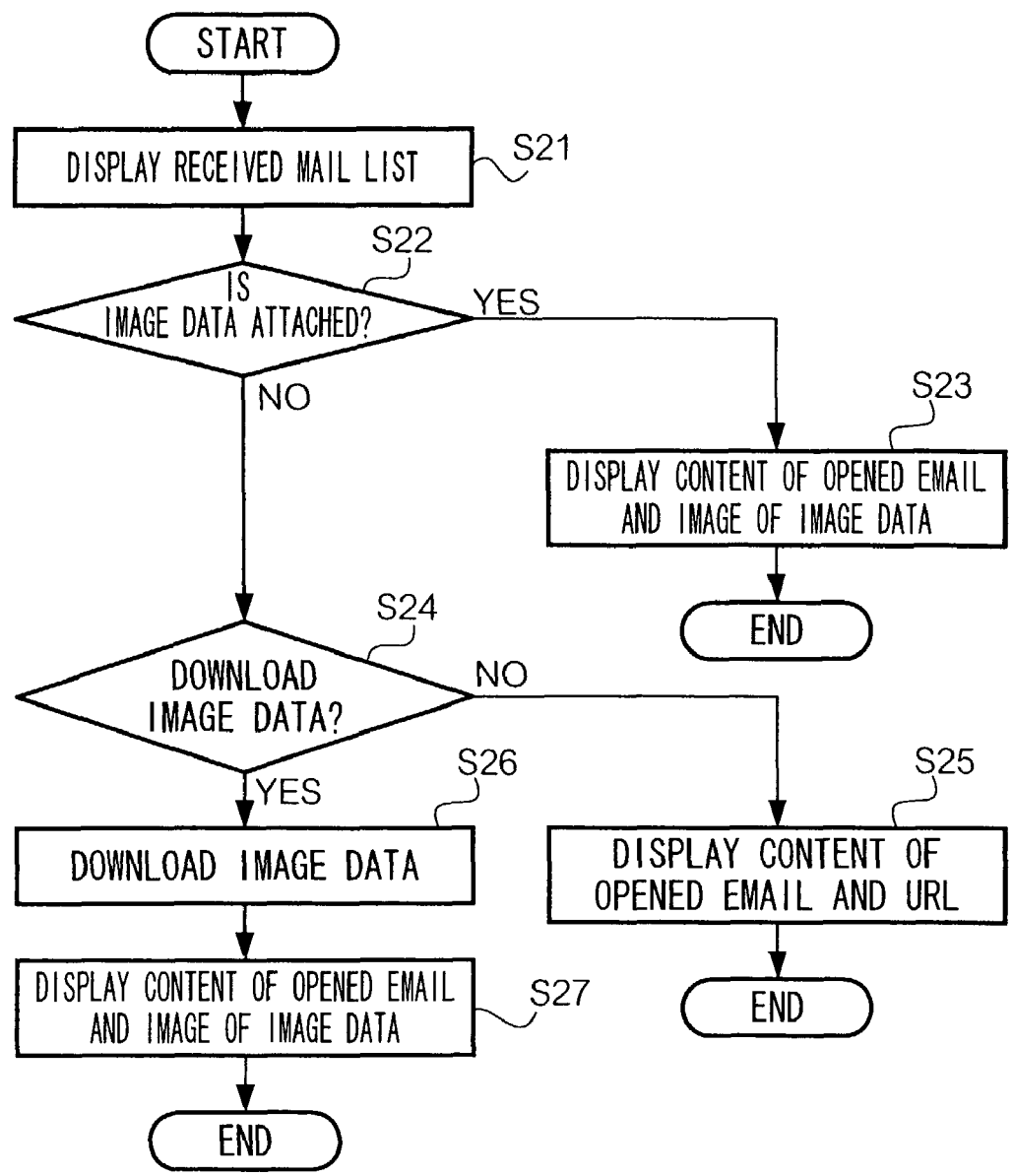
FIG. 5 is a flow chart showing an example of an operation in the present embodiment in which an already-read image-introducing email is reopened.

Referring to FIG. 5, an operation will be described, in which an image-introducing email, once closed with or without storing the data, is reopened by a user under the condition in which the image-introducing email has been received and opened.

First, when a "browsing an email" mode is designated by a user from the main menu displayed on the display screen of mobile phone 10A, CPU 11 reads out the email software from AP storage area 124 and executes the software. Then, CPU 11 displays the name of the sender, or the title of the received email stored in mail document storage area 1231, on a received mail list of the display screen (step S21).

Next, when an instruction to reopen an image-introducing email, which has ever been opened, from the emails displayed on a received mail list is made by a user, CPU 11 determines whether the image data attached to the email instructed to be opened is stored in data storage area 126 (step S22).

When the result of determination of step S22 is "Yes", CPU 11 attaches the image of the image data stored in image data storage area 126 to the email, which is instructed to be opened, and displays the opened email with the image of the image data on the display screen (step S23).

When the result of the determination in step S22 is "No", CPU 11 displays a message saying, "this mail has an image attached, do you download the image again?" on the display screen, and commands the user to instruct whether to perform the downloading (step S24).

When the result of the determination in step S24 is "No", CPU 11 display on the display screen (step S25) the contents of the email, which the user instructs to be opened. At this time, CPU 11 displays a URL of the image data included in the email on the display screen. When an instruction to download is made through an input operation, it is possible to download the image data corresponding to the URL.

When the result of the determination in step S24 is "Yes", CPU 11 extracts a URL and a file name of the image data from mail list storage area 127 on the basis of the identification ID of the image-introducing email, which is instructed to be opened. CPU 11 is then downloads the image data from contents server 40 on the basis of the extracted URL and the file name (step S26).

CPU 11 attaches the image of the downloaded image data to the opened email and displays the opened email with the image of the image data on the display screen (step S27).

Effects of the present embodiment explained above will be outlined as in the following.

First, when a user (hereafter, user A) wants to provide image data of a certain site to another user (hereafter, user B), generally speaking, user A is required to obtain the image data from the site and then transmit the image data to user B. Accordingly, a communication cost for downloading from the site, image data with a large quantity of information, is incurred by user A, and a communication cost for transmitting the obtained image data to user B from user A is also generated.

However, according to the present embodiment, since the image data with a large quantity of information is transmitted directly from the site to user B, it is possible to reduce the overall communication cost.

Furthermore, in the conventional art, user A must pay a communication charge to collect the image data from the site, although it is user B, who is the one who finally receives the image data.

In the present embodiment, however, since user B who actually obtains the image data must bear the communication cost of obtaining the image data.

Furthermore, according to the present embodiment, since it is possible to discard image data and store a received email according to a user's instruction, it is possible to save the memory resource.

Also, according to the present embodiment, when an image-introducing email is reopened on a different occasion, and the image data is downloaded by using a URL contained within the image-introducing email is stored in image data storage area 126, the image data is read out and displayed along with the content of the email. Therefore, at the time of subsequent opening of an image-introducing email, it is possible to avoid downloading the same image data.

The present embodiment can be modified as follows:

<First Modification>

In the above embodiment, a mobile phone is used as a communication terminal, but communication terminals are not limited to mobile phones. For example, simple mobile phones having the function to perform wireless communication with base stations of mobile communication networks, and mobile type information terminal connected to a mobile phone, or a simple type of mobile phone can be used as a communication terminal. A personal computer or a mobile type information terminal, which can access a contents server, or a mail server via a network such as the Internet or a Local Area Network (LAN) on behalf of mobile communication networks, may also be used as communication terminals.

<Second Modification>

In the present modification, a user can designate either the automatic or the manual mode on a mobile phone by performing operation unit 14 beforehand. When the automatic mode is set, as in the embodiment described above, CPU 11 of a mobile phone downloads the image data from contents server 40 automatically when opening an image-introducing email. When the manual mode is designated, CPU 11 of mobile phone displays a message saying, "this email has an image attached, do you want to download the image again?" on the display screen of displaying unit 16 at the time of opening the image-introducing e-mail, and commands a user to instruct whether or not to perform downloading. When the user gives the instruction to perform downloading by operation unit 14, CPU 11 downloads the image data from the contents server.

<Third Modification>

In the above-mentioned embodiment, the downloading function is triggered at the time of opening the image-introducing email. But, the trigger to download the email is not limited to the embodiment described above. For example, it is also possible to modify the embodiment so that the mobile phone downloads the image data from a contents server at the time of receiving an email, and stores the image data in image data storage area 126.

<Fourth Modification>

Contents obtained from a network do not only include image, but also contents that include music data, voice data, and document file data. The present modification enables a mobile phone to replay various contents. In the present modification, a mobile phone comprises various replaying units that can convert music or image data included in email contents into recognizable signals, by an audio-replaying unit, and an image-replaying unit. Besides, CPU as a controller, when opens and displays an email including a URL on a displaying unit, identifies the type of the contents on the basis of an identification included in the URL, and replays the information included in the contents by a replaying unit appropriate to the type of the contents. For example, when music data is included in the content, the data is replayed as sound from a audio replaying unit, whereas when image data is included in the content, the data is displayed as an image on a displaying unit.

<Fifth Modification>

The present invention is applicable to the production and sale of a new generation of mobile phones; to operating the mobile phone so that it can deliver, via a network, a program executed by a CPU for receiving an email or receiving email contents, described in FIG. 4 and FIG. 5, to general users; and also to storing such a program in a storage medium such as a CD and a FD and delivering the program to general users.

The invention claimed is:

1. A wireless mobile communication terminal comprising a central processing unit, a wireless communication unit, a storage unit, an operation unit configured to receive commands from a user of the communication terminal, a display unit, and a memory having computer readable code embodied therein for execution by the central processing unit comprising:
    code to enable storage in the storage unit of mode setting data indicative of one of an automatic mode and a manual mode in response to receipt of a selection instruction from the user with the operation unit,
    code to control the wireless communication unit to receive an email message from a mail server,
    code to analyze the email message to determine whether the email message includes a uniform resource locator indicative of a location where a data file is stored in a network,
    code to control the display unit to display a screen to prompt the user to download the data file in response to determination that the email message includes the uniform resource locator and that mode setting data indicative of the manual mode is stored in the storage unit prior to receipt of the email message, and
    code to control the wireless communication unit to download the data file from the location indicated by the uniform resource locator in response to determination that the email message includes the uniform resource locator, and that the mode setting data stored in the storage unit prior to receipt of the email message is indicative of the automatic mode, or that the operation unit is in receipt of an instruction from the user to download the data file.

2. The wireless mobile communication terminal according to claim 1, the computer readable code embodied in the memory further comprising:
    code to control the display unit to display a content of the email message, and
    code to control the display unit to display, in response to the downloaded data file containing graphic data or text data, both the graphic data or text data and the content of the email message in a single screen.

3. The wireless mobile communication terminal according to claim 1, further comprising an audio replaying unit for replaying audio data, the computer readable code embodied in the memory further comprising:
    code to control the display unit to display a content of the email message, and
    code to control the audio replaying unit to replay audio data included in the downloaded data file in response to presence of the audio data in the downloaded data file.

4. The wireless mobile communication terminal according to claim 1, further comprising a multimedia replaying unit configured to replay multimedia data, the computer readable code embodied in the memory further comprising:
    code to control the display unit to display a content of the email message, and
    code to control the multimedia replaying unit to replay multimedia data in response to presence in the downloaded data file of the multimedia data.

5. A wireless mobile communication terminal comprising a central processing unit, a wireless communication unit, a storage unit, an operation unit configured to receive commands from a user of the communication terminal, a display unit, and a memory having computer readable code embodied therein for execution by the central processing unit, the computer readable code comprising:
    code to control the wireless communication unit to receive, from a content server over a network, display instruction data that includes instructions to display a list of titles of various image data, wherein each of the titles in the list has embedded therein one or more uniform resource locators, wherein each of the one or more uniform resource locators indicates a location in the network where an image data file corresponding to one of the respective titles is stored, and wherein the image data file is configured for display as an image within an opened email,
    code to control the display unit to display a screen to prompt a user of the communication terminal to select one of the titles from the list,
    code to generate an email message containing at least one of the one or more uniform resource locators embedded in a selected one of the titles in response to receipt, with the operation unit, of a user selection of the selected one of the titles, and
    code to control the wireless communication unit to transmit the email message to a mail server.

6. The wireless mobile communication terminal according to claim 5, the computer readable code embodied in the memory further comprising:
    code to control the display unit to display the list based on the instructions to display the list of various titles of image data contained in the display instruction data.

7. The wireless mobile communication terminal according to claim 5, the computer readable code embodied in the memory further comprising:
    code to control the wireless communication unit to download one or more image data files from one or more locations indicated by the one or more uniform resource locators embedded in the titles.

8. The wireless mobile communication terminal according to claim 7, the computer readable code embodied in the memory further comprising:
    code to control the display unit to display, in response to the downloaded one or more image data files including graphic data or text data.

9. The wireless mobile communication terminal according to claim 7, further comprising an audio replaying unit for replaying audio data, the computer readable code embodied in the memory further comprising:
    code to control the audio replaying unit to replay audio data included in the downloaded one or more image data files in response to the presence of the audio data in the downloaded one or more image data files.

10. The wireless mobile communication terminal according to claim 7, further comprising a multimedia replaying unit configured to replay multimedia data, the computer readable code embodied in the memory further comprising:
    code to control the multimedia replaying unit to replay, multimedia data in response to presence in the downloaded one or more image data files of the multimedia data.

11. A communication terminal comprising:
    a processor;
    a memory in communication with the processor, the memory including an email application and a mode indicator;
    a wireless communication unit coupled with the processor, the wireless communication unit configured to transmit and receive email messages over a wireless network;
    the processor configured to automatically request download over the wireless network of a content having a storage location indicated in a received email when the mode indicator is set by a user to automatic, and the processor further configured to request download of the content over the wireless network from the storage location indicated in the email only in response to receipt of a user command to access the email when the mode indicator is preset by a user to manual;

the processor further configured to temporarily store the downloaded content and display the temporarily stored downloaded content with the substance of the received email upon the received email being opened by a user, and generate a prompt to query a user to permanently store the downloaded content in the memory in response to receipt of a user command to close the received email; and the processor further configured, in response to receipt of a user command to access the received email again after the received email has been closed, to prompt the user to download the content again only when the content is not permanently stored in the memory.

12. The communication terminal of claim 11, further comprising a display unit controllable by the processor to display a title list of attachment contents accessible over the wireless network, the processor, in response to selection by a user of an attachment content from the title list of attachment contents, configured to generate an outgoing email that includes a storage location within the wireless network of the selected attachment content absent download of the selected attachment content to the communication terminal.

13. The communication terminal of claim 11, wherein the storage location indicated in a received email comprises a uniform resource locator and a specific identifier, the specific identifier indicative of a type of the content or a file extension of at least some of the content.

14. The communication terminal of claim 11, wherein the processor is configured to automatically request download over the wireless network of the content having the storage location indicated in a received email upon receipt of the email when the mode indicator is preset to automatic.

* * * * *

UNITED STATES PATENT AND TRADEMARK OFFICE
CERTIFICATE OF CORRECTION

| | |
|---|---|
| PATENT NO. | : 7,979,055 B2 |
| APPLICATION NO. | : 10/239952 |
| DATED | : July 12, 2011 |
| INVENTOR(S) | : Yuko Watanabe et al. |

It is certified that error appears in the above-identified patent and that said Letters Patent is hereby corrected as shown below:

On the Title Page under item (56), In the References Cited - Foreign Patent Documents Please delete "CN 396308 7/2000".

Signed and Sealed this
First Day of May, 2012

David J. Kappos
*Director of the United States Patent and Trademark Office*